United States Patent Office 3,546,213
Patented Dec. 8, 1970

---

3,546,213
2 - (BROMOMETHYL) - 2,3,4,5 - TETRAHYDRO - 7-
(o - HYDROXYPHENYL) - 5 - OXO - 1,4 - OXAZE-
PINE-6-CARBOXYLIC ACID δ-LACTONE
John S. McIntyre, Sarnia, Ontario, and Allan R. Knight, Petrolia, Ontario, Canada, assignors to The Dow Chemical Company, Midland, Mich., a corporation of Delaware
No Drawing. Filed June 24, 1968, Ser. No. 739,200
Int. Cl. C07d 87/54
U.S. Cl. 260—239.3       1 Claim

ABSTRACT OF THE DISCLOSURE

The present disclosure is directed to the compound 2-(bromomethyl) - 2,3,4,5 - tetrahydro - 7 - (o-hydroxyphenyl)-5-oxo-1,4-oxazepine-6-carboxylic acid δ-lactone, its method of preparation as well as its use as a bactericide and fungicide.

SUMMARY OF THE INVENTION

The present invention relates to a novel and useful δ-lactone derivative. It is more particularly concerned with a new compound 2-(bromomethyl)-2,3,4,5-tetrahydro-7-(o-hydroxyphenyl) - 5 - oxo - 1,4 - oxazepine-6-carboxylic acid δ-lactone. This compound can be represented by the Formula I:

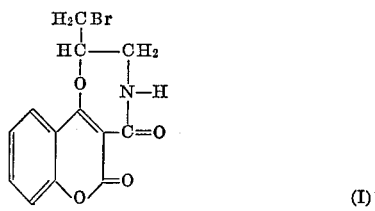

(I)

The compound of the present invention is a powdery solid and is very useful for the control of a wide variety of pests such as the bacteria and fungal organisms *Staphylococcus aureus, Bacillus subtilis* and *Mycobacterium pheli, Candida pelliculosa, Pullularia pullulans, Salmonella typhosa, Rhizopus nigricans, Aspergillus tereus, Candida albicans, Trichophyton mentagrophytes* and the plant pathogenic fungal organisms downey mildew and apple scab fungus.

The 2 - (bromomethyl) - 2,3,4,5 - tetrahydro-7-(o-hydroxyphenyl)-5-oxo-1,4-oxazepine - 6 - carboxylic acid δ-lactone of the invention may be prepared by the reaction of 3 - (2,3-dibromopropylcarbamoyl)-4-hydroxycoumarin and an amine such as triethylamine. Other tertiary amines such as trimethylamine, tripropylamine, tributylamine, triisobutylamine and other compounds such as piperidine may also be employed.

The amount of amine employed is not critical and it is usually employed in an amount sufficient to insure the removal of the hydrogen bromine given off during the cyclization of the 3-(2,3-dibromopropylcarbamoyl)-4-hydroxycoumarin.

In carrying out this reaction, the 3-(2,3-dibromopropylcarbamoyl)-4-hydroxycoumarin and triethylamine or other suitable amine are contacted and maintained together in any convenient fashion. The reaction is allowed to proceed at a temperature between room temperature and 125° C. and is usually carried out over a steam bath. The pressure is not critical and is usually maintained about ambient atmospheric pressure. The reaction is allowed to proceed until the cyclization is complete, usually from about 1 hour to 24 hours. The solid product is recovered from the hot reaction mixture by filtration.

DESCRIPTION OF SOME PREFERRED EMBODIMENTS

The following example illustrates the present invention and the manner by which it can be practiced but, as such, should not be construed as a limitation upon the overall scope of the same.

EXAMPLE 1

2-(bromomethyl) - 2,3,4,5 - tetrahydro - 7 - (o-hydroxyphenyl)-5-oxo-1,4-oxazepine-6-carboxylic acid δ-lactone A solution is prepared in a boiling flask containing 3.0 grams (0.0074 mole) of 3-(2,3-dibromopropylcarbamoyl)-4-hydroxycoumarin and 1.09 grams of triethylamine. This solution was placed on a steam bath and maintained thereon overnight. The reaction mixture was then filtered while hot and the solid 2-(bromomethyl)-2,3,4,5-tetrahydro - 7 - (o-hydroxyphenyl) - 5 - oxo-1,4-oxazepine-6-carboxylic acid δ-lactone product is recovered. The product, a solid, white powder, was obtained in a yield of 2.2 grams (93 percent), had a melting point of 254–255° C., and a molecular weight of 325 and was found by analysis to have carbon, hydrogen, nitrogen and bromine contents of 48.24, 2.87, 4.34 and 24.49 percent, respectively, as compared with the theoretical contents of 48.16, 3.09, 4.32 and 24.67 percent, respectively, calculated for the named structure.

The compound of the invention is employed as a toxicant in pesticides for the control of bacteria and fungal organisms. For such uses, the compound can be employed in an unmodified form or dispersed on finely divided solids and employed as dusts. Such mixtures can also be dispersed in water with or without the aid of a surface-active agent and the resulting aqueous suspensions employed as sprays. In other procedures, the product can be employed as active constituent in solvent solutions, oil-in-water or water-in-oil emulsions of aqueous dispersions. The augmented compositions are adapted to be formulated as concentrates and subsequently diluted with additional liquid or solid adjuvants to produce the ultimate treating compositions. Good results are obtained when employing compositions containing pesticidal concentrations and usually from about 1 to 10,000 parts by weight of the compound per million parts of such composition.

In a representative operation, the compound of the present invention was tested for its activity for the control of bacterial and fungal organisms.

A suspension containing 2-)bromomethyl)-2,3,4,5-tetrahydro - 7 - (o-hydroxyphenyl)-5-oxo-1,4-oxazepine-6-carboxylic acid δ-lactone was prepared by adding the compound to isopropanol and then diluting the mixture to a concentration of about 500 parts by weight of active compound per million parts of warm melted nutrient agar. The resultant treated nutrient was poured into petri dishes and allowed to solidify. The compound of the invention was the sole toxicant in the treated nutrient. Check dishes were also prepared from the nutrient agar containing none of the toxicant. Droplets of representative organism cultures were applied to the agar surface in each petri dish. The inoculated nutrient agar cultures were then incubated for about 48 hours under conditions conducive to growth of the test organisms. In such operation, the compound of the invention was found to give 100 percent kill and control of the organisms *Staphylococcus aureus, Bacillus subtilis, Candida pelliculosa, Salmonella typhosa, Candida albicans, Rhizopus nigricans, Aspergillus terreus, Trichophyton mentagrophytes* and *Mycobacterium phlei*. In each of the above determinations, the check nutrient agar supported a heavy growth of the test organisms.

In another representative operation, an aqueous suspension of 2-(bromomethyl)-2,3,4,5-tetrahydro - 7 - (o-hydroxyphenyl)-5-oxo-1,4-oxazepine - 6 - carboxylic acid δ-lactone was prepared containing about 600 parts of the compound, as the sole toxicant, per million parts by weight of ultimate suspension, by mixing the compound with a small amount of acetone and a wetting agent and diluting the mixture with water until the above concentration was reached. Individual host plants were thoroughly wetted with the suspension and thereafter inoculated with the fungal pathogens, apple scab fungus, and downy mildew. Check plants which had not been treated with a toxicant were also inoculated with the same pathogens. The plants were maintained under conditions conducive to growth of the disease until the disease symptoms were well developed on the check plants. In such operation, the toxicant was found to give 100 percent kill and control of the test pathogens on the treated plants.

PREPARATION OF STARTING MATERIALS

The 3-(2,3-dibromopropylcarbamoyl) - 4 - hydroxycoumarin may be prepared by the bromination of 3-allylcarbamoyl-4-hydroxycoumarin in a solvent such as chloroform at temperatures below 5° C.

The 3-allylcarbamoyl - 4 - hydroxycoumarin may be prepared by the condensation of 4-hydroxycoumarin with allyl isocyanate or by the reaction of allylamine with 3-carbamoyl-4-hydroxycoumarin in a sealed tube. This latter preparation is further described in U.S. Pat. 3,122,557.

The 3-carbamoyl - 4 - hydroxycoumarin may be prepared by the reaction of one mole of 4-hydroxycoumarin and one mole of urea at temperatures of from 140°–150° C. An alternative procedure is the reaction of one mole of 4-hydroxycoumarin with one mole of ethyl carbamate in pyridine at a temperature of 190° C. In both procedures, the reaction mixture is cooled, diluted with methanol, filtered and the product may be crystallized from an acetic acid-methanol mixture employing standard procedures.

What is claimed is:

1. 2 - (bromomethyl)-2,3,4,5-tetrahydro - 7 - (o-hydroxyphenyl) - 5 - oxo - 1,4 - oxazepine-6-carboxylic acid δ-lactone.

References Cited

UNITED STATES PATENTS 2,985,649   5/1961   Lombardino et al. __ 260—239.3

HENRY R. JILES, Primary Examiner

R. T. BOND, Assistant Examiner

U.S. Cl. X.R.

424—244